Feb. 25, 1947.   R. D. CAVANAGH   2,416,612
DUPLEX COMBINATION EXTENSION LATHE
Filed April 20, 1944   3 Sheets-Sheet 1
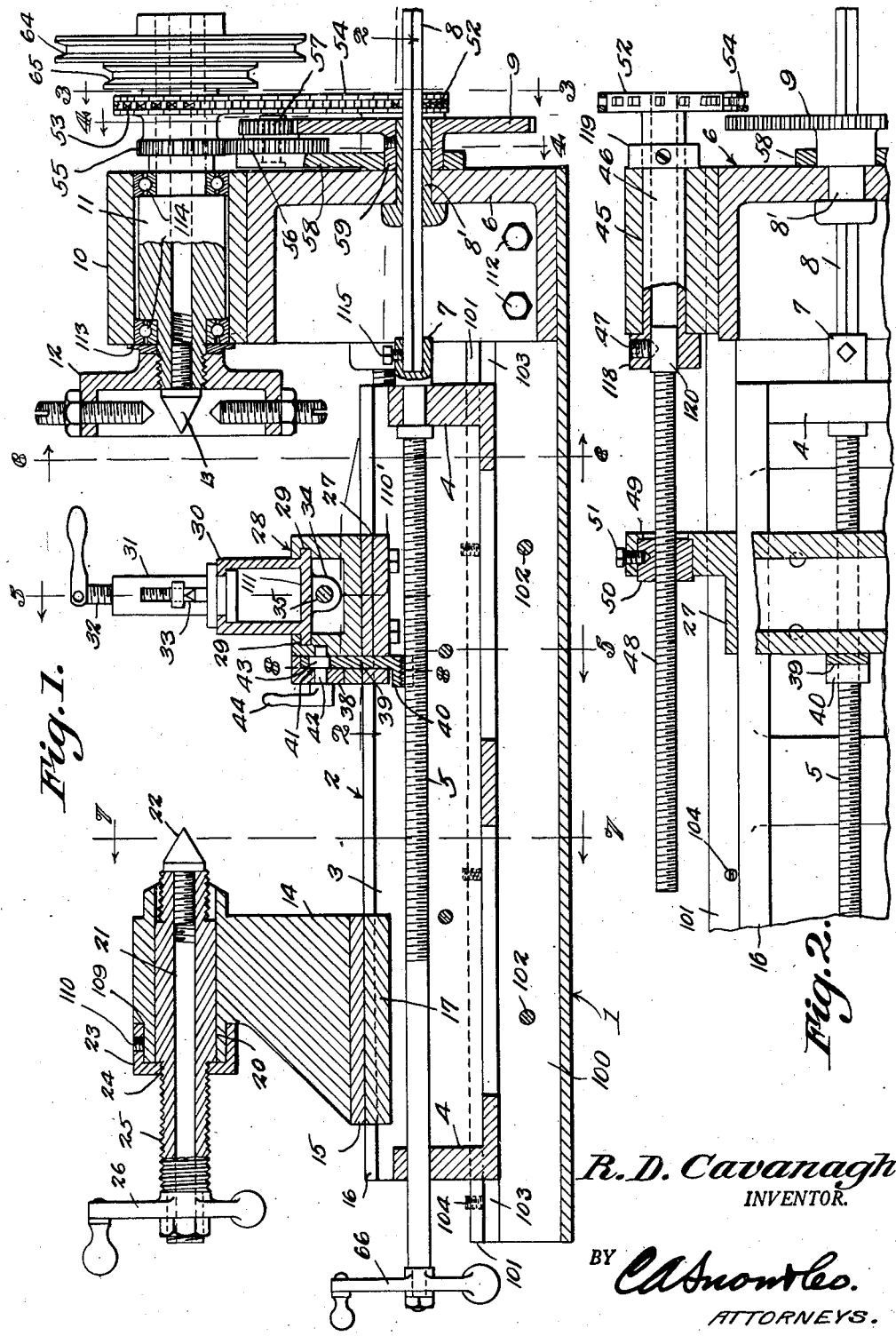
R. D. Cavanagh
INVENTOR.
BY CA Knowles.
ATTORNEYS.

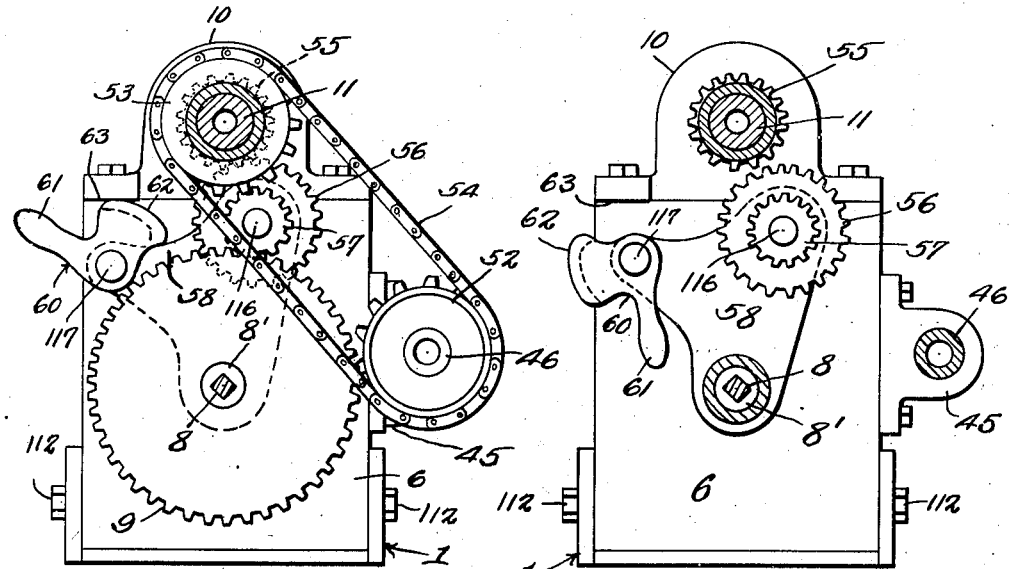
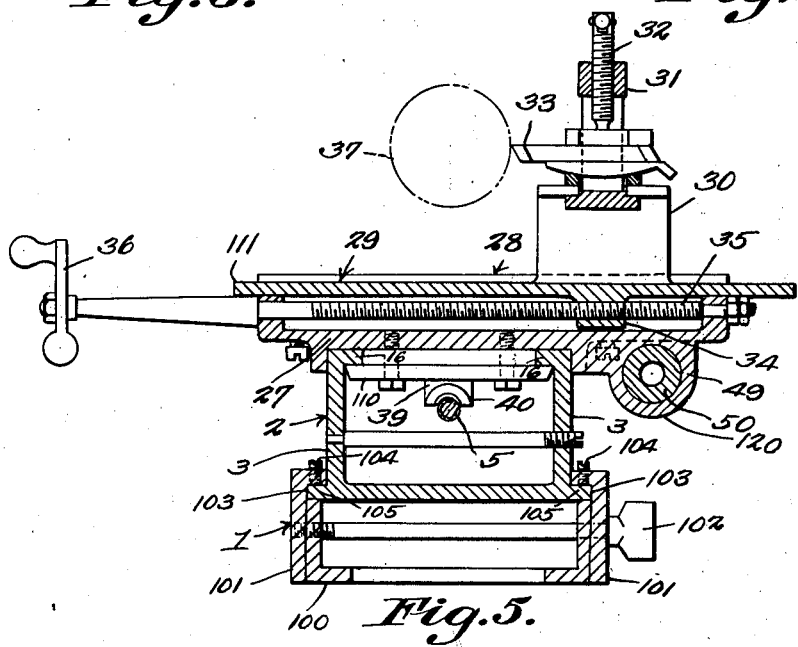

Feb. 25, 1947.   R. D. CAVANAGH   2,416,612
DUPLEX COMBINATION EXTENSION LATHE
Filed April 20, 1944   3 Sheets-Sheet 3

R. D. Cavanagh
INVENTOR.

BY *CA Knowles*
ATTORNEYS.

Patented Feb. 25, 1947

2,416,612

UNITED STATES PATENT OFFICE 2,416,612

DUPLEX COMBINATION EXTENSION LATHE

Rex D. Cavanagh, Bloomington, Ill., assignor of twenty-five per cent to Robert Nord Fagerburg, Bloomington, Ill.

Application April 20, 1944, Serial No. 531,927

3 Claims. (Cl. 82—2)

The device forming the subject matter of this application is a lathe, and one object of the invention is to provide novel means whereby the lathe may be adapted readily and quickly to cut threads of different pitches.

Another object of the invention is to provide novel means whereby the combined longitudinal and cross feed slide may be actuated by hand or by power, at the will of an operator.

A further object of the invention is to improve the headstock and the tailstock, and to bring about improvements in the combined cross feed and longitudinal feed slide.

A further object of the invention is to provide a novel shiftable carriage, movable on a bed, and carrying a tailstock and a combined cross feed and longitudinal feed, for movement relatively to each other and relatively to a headstock and associated parts mounted on the bed.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in vertical longitudinal section, a lathe constructed in accordance with the invention, parts remaining in elevation;

Fig. 2 is a longitudinal section taken approximately on line 2—2 of Figure 1, parts being broken away;

Figure 6:
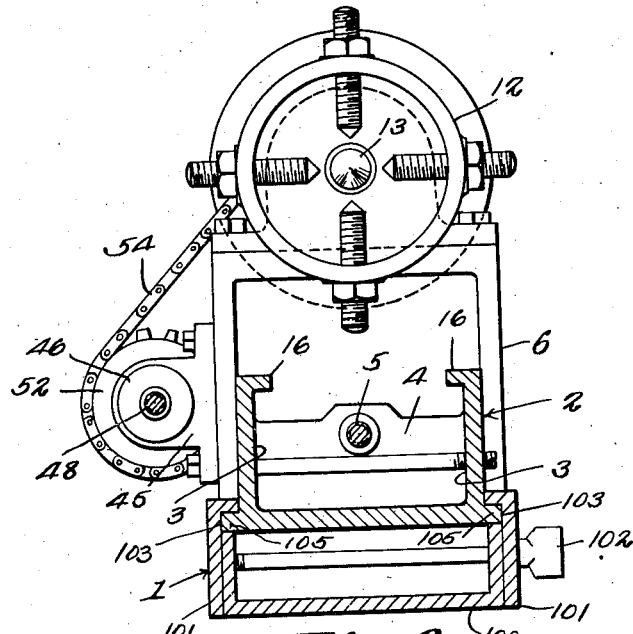
Figures 7, 8:
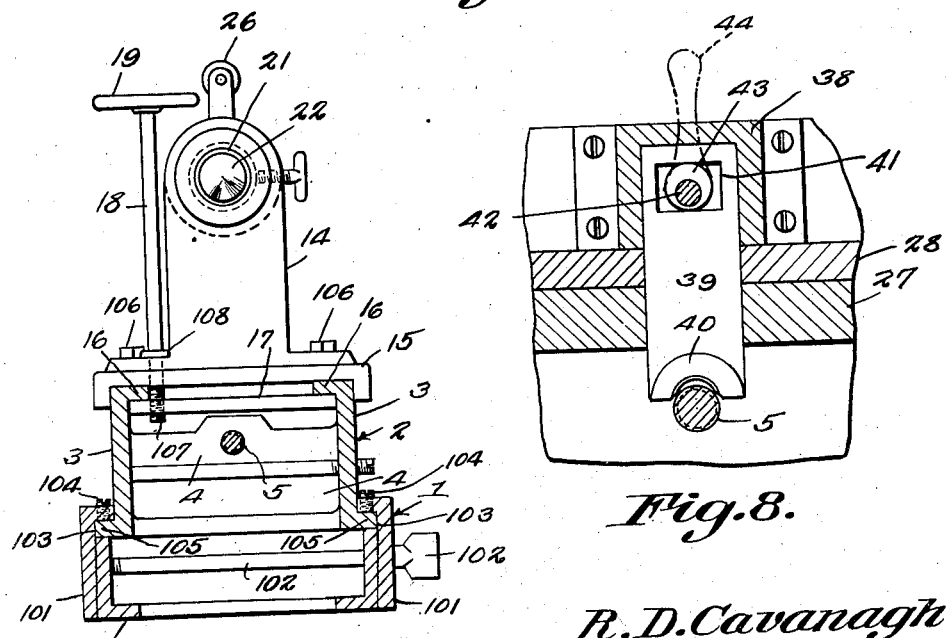

Fig. 3 is a section on the line 3—3 of Fig. 1;
Fig. 4 is a section on the line 4—4 of Fig. 1;
Fig. 5 is a section on the line 5—5 of Fig. 1;
Fig. 6 is a section on the line 6—6 of Fig. 1;
Fig. 7 is a section on the line 7—7 of Fig. 1;

Fig. 8 is a vertical transverse section taken through the means whereby the combined cross feed and longitudinal feed mechanism may be coupled operatively with the feed screw.

In carrying out the invention, there is provided a bed 1, comprising a channel 100, the cross section of which is shown in Fig. 5. On the outer, lateral surfaces of the channel 100, angle members 101 are held by screws 102. The inwardly projecting, transverse flanges of the angle members 101 cooperate with the side walls of the channel 100, to define guideways 103. The transverse flanges of the angle members 101 are supplied with holding devices, which may be set screws 104.

The numeral 2 designates a carriage, adjustable longitudinally of the bed 1. Upon the carriage 2 is mounted a tailstock, a longitudinal and cross feed mechanism, and an adjustable, all-angle, tool-holding vise all to be dealt with specifically hereinafter.

The carriage 2 embodies longitudinal side rails 3 and transverse end members 4, shown in Fig. 1. Figure 5 discloses that the lower portions of the side rails 3 of the carriage 2 have outstanding flanges 105, received for reciprocation in the guideways 103. Since the carriage 2 may be adjusted longitudinally of the bed 1, the lathe is well adapted to receive work of different lengths, grossly considered; although the lathe embodies means which renders frequent adjustments of the carriage on the bed unnecessary. The set screws 104, which are carried by the inwardly projecting flanges of the angle members 101, may be advanced to bear upon the flanges 105 of the carriage 2, and, thus, the carriage may be secured in adjusted positions longitudinally of the bed 1, which forms part of the supporting structure. At their upper edges, the side rails 3 of the carriage 2 are supplied with inward extended flanges 16, appearing in Figs. 5 and 7.

A channel-shaped slide or base plate 15 (Fig. 7) receives the upper portion of the carriage 2, and to the slide, the tailstock 14 is secured, as indicated at 106. Below the flanges 16 of the carriage 2 (Fig. 7) is disposed a clamp plate 17. A vertical shaft 18 is journaled in one side portion of the tailstock 14 and is held against downward movement by a collar 108 thereon. The shaft 18 is threaded at 107 into the clamp plate 17, and is manipulated by a hand wheel 19, or equivalent device.

The structure last above described constitutes means whereby the tailstock 14 may be held fixedly in any position to which it may have been adjusted longitudinally of the carriage 2.

The tailstock 14 terminates at its upper end in a tubular bearing 20, wherein a tail spindle 21 is removably mounted. The tail spindle 21 is manipulated by a crank 26 or the like, the tail spindle having a transverse, circumscribing shoulder 109, engaged by a cap 23, held on the bearing 20 by a set screw 110 or the like. The tail spindle 21 is threaded for advancement and retraction, as indicated at 25, into an opening 24 in the cap 23. A renewable and interchangeable center point 22 is threaded or held otherwise in the inner end of the tail spindle 21.

A slide 27 has adjustment longitudinally of the carriage 2 and is held thereon, for such adjustment, by any appropriate or conventional means, designated by the reference character 110'. The slide 27 is provided with a transverse track 28, to which is secured a vertical guide 38, best delineated in Fig. 8. A plate 39 is mounted for reciprocation in the guide 38. The plate 39 may be referred to as a carrier, since it carries, at its lower end, a trough-like, internally threaded member or half-nut 40.

The plate or carrier 39 is provided with an opening 41, wherein operates an eccentric 43 on a horizontal shaft 42, journaled in the guide 38 and actuated by a handle 44.

The construction of the mechanism last above described is such that the plate or carrier 38 and the half-nut 40 may be moved upwardly or downwardly, at the will of an operator, for a purpose to be set forth hereinafter.

The slide 27 has oppositely disposed grooves 29 (Fig. 1), in which a cross feed slide 111 is mounted for reciprocatory adjustment at the will of an operator, the aforesaid adjustment being communicated to the slide through the instrumentality of a feed screw 35, mounted to rotate on the slide 27, but held against longitudinal movement therein, the feed screw having an operating handle 36. The feed screw 35 is threaded through a depending lug 34 on the cross feed slide 111.

The cross feed slide 111 includes an upstanding pedestal 30, wherein a tool post 31 is mounted for adjustment about a vertical axis, the numeral 32 designating any appropriate means for holding the tool post against rotation, and for retaining a tool 33 in operative relation to the work 37—all as well understood by those skilled in the art.

A headstock 6 is secured at 112 to the bed 1, and upon the headstock is secured a tubular head 10, in which are located anti-friction bearings 114, wherein is journaled a head spindle 11. The bearings 114, whether of the ball or roller type, reduce the coefficient of friction under all speeds, prevent premature side play and wear, and serve as thrust bearings. The head spindle 11 carries a chuck 12, of such construction as the nature of the work may demand, the removable and renewable center point or mandrel of the head spindle being designated by the numeral 13. A washer 113 or the like, on the head spindle 11, overlaps and retains the innermost anti-friction bearing 114, and is retained by the chuck 12.

Speed-change pulleys 64 and 65 are secured to the head spindle 11, and it is from them that the head spindle receives rotation immediately, the work between the centers 13 and 22 being rotated relatively to the tool 33 of Fig. 5.

It is shown in Fig. 1 that a feed screw 5 is mounted for rotation in the end plates 4 of the carriage 2, the feed screw being retained against longitudinal movement therein. Through the instrumentality of the carrier or plate 39 of Fig. 8, the half-nut 40 may be lowered, into engagement with the feed screw 5. The slide 27 and parts carried thereby then may be adjusted longitudinally of the carriage 2, by hand, since the feed screw is equipped with means 66 whereby rotation may be imparted to it manually. The feed screw 5, however, may acquire rotation from the head spindle 11, and the means to that end will next be set forth.

A set screw or the like, indicated at 115, holds in the end of the feed screw 5, a shaft 8 of polygonal cross section, the feed screw having a socket 7 for the reception of one end of the shaft. The shaft 8 may be considered as part of the feed screw 5. A sleeve 8' rotates with the shaft 8 and, in turn, is mounted to rotate in the headstock 6. The hub 59 of a gear 9 is secured to the sleeve 8'. The shaft 5 is received in the sleeve 8'.

An arm 58 is mounted to swing at the will of an operator on the hub 59 of the gear 9. A pinion 57 and a gear 56 are mounted at 116 (Fig. 4) to rotate as one piece on the arm 58. When the arm 58 is swung to the left in Fig. 4, the pinion 57 comes into mesh with the gear 9 and the gear 56 comes into mesh with a gear wheel 55 mounted to rotate on the head spindle 11.

Under such circumstances there is provided a power driven mechanism for rotating the feed screw 11 and for moving the slide 27 longitudinally of the carriage 2, that mechanism comprising one of the pulleys 64—65, the head spindle 11, the gear 55, the gear 56, the pinion 57 and the gear 9.

Any suitable means may be provided for holding the arm in position to the left of that which the arm occupies in Fig. 4, the gear 56 being in mesh with the gear 55, and the pinion 57 being in mesh with the gear 9. Having that end in view, a bellcrank lever 60 is fulcrumed at 117 on the arm 58, the bellcrank lever including a handle 61 and a cam 62, the cam being adapted to be engaged with a shoulder 63 on the headstock 6.

When it is desired to employ the lathe for thread cutting, the mechanism of Fig. 8 is actuated to disengage the half-nut 40 from the feed screw 5, motion being imparted to the slide 27, longitudinally of the carriage 2, by an instrumentality best shown in Fig. 2 and embodying details which appear in Figs. 3, 4 and 5.

The headstock 6 carries a lateral bracket 45, wherein a tubular shaft 46 is journaled for rotation. A head 118 and a set collar 119 on the shaft 46 cooperate with the bracket 45, to prevent longitudinal movement of the shaft.

Rotation is imparted to the shaft 46 by way of a sprocket wheel 52 thereon, the head spindle 11 carrying a sprocket wheel 53, the sprocket wheels being connected operatively by a sprocket chain 54.

The slide 27 is equipped with a lateral offset 49, provided with a socket, wherein a nut 50 is removably and interchangeably held, by means of a set screw 51. A feed screw 48 is threaded through the nut 50. The feed screw is provided with a foot 120, held in the bore of the hollow shaft 46, and more specifically in the part 118, by a set screw 47 or the like.

The sprocket wheel 53, the head spindle 11, the sprocket chain 54 and the sprocket wheel 52, constitute means for rotating the shaft 46 and the feed screw 48, the feed screw functioning to advance the slide 27 along the carriage 2. By loosening the set screws 47 and 51, the feed screw 48 and the nut 50 may be removed, a pair of corresponding elements being substituted therefor, the threading thereof being such as to advance the slide 27 accordingly, to cut, by means of the tool 33 of Fig. 5, a thread having a pitch differing from the pitch resulting from the operation of the parts which have been removed.

The carriage 2 may be held in adjusted positions, longitudinally of the bed 1, by set screws 104. The structure shown in Fig. 8 raises the half-nut 40 out of engagement with the feed screw 5 and lowers the half-nut into engagement with the feed screw. The tailstock 14 is held in adjusted positions, longitudinally of the carriage 2, by way of the shaft 18 of Fig. 7 and attendant parts. The feed screw 35 of Fig. 5 brings about a cross feed of the slide 111 and parts which it carries. When thread cutting is not to be carried out, the slide 27 is moved longitudinally of the carriage 2 by screw 5, the shaft 8 and parts shown in Fig. 3, which connect the shaft operatively with the head spindle 11. When screw cutting is to be carried on, the half-nut 40 may be disengaged from the screw 5 and, then, the sprocket chain structure of Fig. 3 actuates the screw 48. An interchange of the members 59 and 48 be made, to cut threads of different pitches.

I claim:

1. A lathe comprising a bed, a headstock mounted on the bed, a channeled carriage having flanges, a tailstock mounted for sliding movement on the flanges and longitudinally of the carriage, a clamp plate in the carriage and movable under the flanges with the tailstock, means extending above the carriage and carried by the tailstock for actuating the plate to clamp the flanges between the plate and the tailstock, a combined cross feed and longitudinal feed mechanism, means for mounting said mechanism on the carriage for movement longitudinally of the bed, means for mounting the carriage on the bed for free sliding movement toward and away from the headstock under push or pull imparted directly to the carriage by an operator, thereby to secure a rapid and gross adjustment of said mechanism longitudinally of the bed, means mounted on the carriage and cooperating with said mechanism to secure a slow and fine adjustment thereof, longitudinally of the bed, and a releasable holding device cooperating with the carriage and the bed to secure the carriage in fixed positions longitudinally of the bed.

2. A lathe comprising a longitudinally channeled bed having guideways extending longitudinally therein, a longitudinally channeled carriage set in the guideways and slidable longitudinally thereof into and out of the bed, means for clamping the carriage in the guideways, a headstock mounted within one end of the channeled bed and secured thereto, a tailstock slidably mounted on the carriage, means for clamping the tailstock to the carriage, separate hand-operated and power-driven feed screws, a shaft detachably connected to one of the feed screws, power mechanism operatively connected to said shaft and to the other feed screw, said shaft being detachable from its feed screw to permit actuation of said feed screw independently of the power mechanism, a slide mounted on the carriage and separate means on the slide for operative engagement with the respective feed screws, one of said means being mounted for movement into and out of engagement with its feed screw.

3. In a lathe, the combination with a bed, a carriage slidably mounted in the bed and movable into and out of one end thereof, and means for securing the carriage against movement, of a tailstock on the carriage, a feed screw swiveled in the carriage, a slide mounted on the carriage, tool-holding means on the slide and means cooperating with the feed screw for coupling the slide to the screw, said means including a nut guide carried by the slide, a plate slidably mounted in the guide and extending below the guide and into the carriage, a half nut on the slide positioned for engagement with the feed screw, said plate having an opening, an eccentric rotatably mounted relative to the guide and seated in the opening and means for actuating the eccentric to shift the plate and move the half nut into or out of engagement with the feed screw.

REX D. CAVANAGH.

REFERENCES CITED

The following references are of record in the file of this patent:

UNITED STATES PATENTS

| Number | Name | Date |
|---|---|---|
| 379,313 | Jones et al. | Mar. 13, 1888 |
| 1,031,635 | Fay | July 2, 1912 |
| 1,417,521 | Haumann | May 30, 1922 |

FOREIGN PATENTS

| Number | Country | Date |
|---|---|---|
| 29,797 | German | Dec. 12, 1884 |
| 22,029 | French | Nov. 25, 1920 |
| 50,390 | Swiss | Jan. 12, 1910 |
| 217,293 | Swiss | Feb. 2, 1942 |